(12) United States Patent
Zhang et al.

(10) Patent No.: US 12,565,072 B2
(45) Date of Patent: Mar. 3, 2026

(54) ACTIVE SUSPENSION VEHICLE AND CONTROL METHOD

(71) Applicant: Shandong University of Technology, Zibo (CN)

(72) Inventors: Fan Zhang, Zibo (CN); Jiguo Yang, Zibo (CN); Xuejian Jiao, Zibo (CN); Lijun Li, Zibo (CN); Xianyue Gang, Zibo (CN)

( * ) Notice: Subject to any disclaimer, the term of this patent is extended or adjusted under 35 U.S.C. 154(b) by 0 days.

(21) Appl. No.: 18/400,243

(22) Filed: Dec. 29, 2023

(65) Prior Publication Data
US 2024/0208289 A1      Jun. 27, 2024

(51) Int. Cl.
*B60G 17/016* (2006.01)
*B60G 17/0165* (2006.01)
(Continued)

(52) U.S. Cl.
CPC ....... *B60G 17/016* (2013.01); *B60G 17/0165* (2013.01); *B60G 17/0162* (2013.01);
(Continued)

(58) Field of Classification Search
CPC .............. B60G 17/016; B60G 17/0162; B60G 17/0165; B60G 17/018; B60G 17/0182; B60G 17/01908; B60G 2400/051; B60G 2400/0511; B60G 2400/0512; B60G 2400/0523; B60G 2400/10; B60G 2400/102; B60G 2400/104; B60G 2400/106; B60G 2400/204; B60G 2400/08; B60G 2400/252; B60G 2400/41; B60G 2400/60; B60G 2400/61; B60G 2400/82; B60G 2401/14; B60G 2500/30; B60G 2600/182
See application file for complete search history.

(56) References Cited

U.S. PATENT DOCUMENTS 9,884,532 B2    2/2018  Tsuda
11,142,186 B2    10/2021  Anderson et al.
(Continued)

FOREIGN PATENT DOCUMENTS

CN        114690792 A  *  7/2022

*Primary Examiner* — John M Zaleskas
(74) *Attorney, Agent, or Firm* — Lei Jiang

(57)        ABSTRACT
The present invention discloses an active suspension vehicle and a control method controlling the same. Each wheel of the vehicle is equipped with a telescopically adjustable active actuator. The control method begins by constructing a load and deformation joint control matrix of the vehicle and measuring the current vehicle parameters; then determining vertical displacement excitation of wheels at a next moment, and pre-calculating passive responses of vehicle height, attitude, and wheel loads at the said next moment; determining the vehicle height, attitude, and feasible wheel load expectations at the said next moment, and inverse-calculating adjustment strokes of the suspension; finally, performing active suspension adjustment to chase the vehicle height, attitude, and feasible wheel load expectations in real-time. The disclosure implements synchronous vehicle height, attitude, and wheel loads control for multi-axle vehicles, thus significantly improving their passability, maneuverability, and stability under extreme off-road terrains.

3 Claims, 3 Drawing Sheets

(51) Int. Cl.
    *B60G 17/018*     (2006.01)
    *B60G 17/019*     (2006.01)

(52) U.S. Cl.
    CPC ........ *B60G 17/018* (2013.01); *B60G 17/0182* (2013.01); *B60G 17/01908* (2013.01); *B60G 2400/0511* (2013.01); *B60G 2400/0512* (2013.01); *B60G 2400/0523* (2013.01); *B60G 2400/10* (2013.01); *B60G 2400/102* (2013.01); *B60G 2400/104* (2013.01); *B60G 2400/106* (2013.01); *B60G 2400/204* (2013.01); *B60G 2400/208* (2013.01); *B60G 2400/252* (2013.01); *B60G 2400/41* (2013.01); *B60G 2400/60* (2013.01); *B60G 2400/61* (2013.01); *B60G 2400/82* (2013.01); *B60G 2401/14* (2013.01); *B60G 2500/30* (2013.01); *B60G 2600/182* (2013.01)

(56) References Cited

U.S. PATENT DOCUMENTS

| | | | | |
|---|---|---|---|---|
| 2017/0100980 A1* | 4/2017 | Tsuda | ................. | B60G 17/0165 |
| 2017/0137023 A1* | 5/2017 | Anderson | .............. | B60G 17/02 |
| 2019/0359025 A1 | 11/2019 | Wager | | |
| 2022/0227195 A1* | 7/2022 | Zhang | ................. | B60G 17/018 |
| 2023/0286347 A1* | 9/2023 | Zhao | ................... | B60G 17/018 |

* cited by examiner (a)

Passive
body attitude

Passive
wheel load (b)

Active
body attitude

Active
wheel load (c)

ACTIVE SUSPENSION VEHICLE AND CONTROL METHOD

CROSS REFERENCE TO RELATED APPLICATIONS

This application claims priority of Chinese Patent Application CN202310236995.0, filed on Mar. 13, 2023, entitled: "Active suspension vehicle and control method", the entirety of which are incorporated herein by reference.

FIELD OF INVENTION

The present disclosure relates to the field of active suspension technology and specifically relates to the field of active suspension technology of multi-axle vehicles for extreme off-road terrain traveling.

BACKGROUND ART

The active suspension system and control method of advanced vehicles should be able to realize the vehicle height and attitude adjustment in traveling. While for multi-axle vehicles (with any number of axles of two and more) that have a wide range of off-road driving requirements, there is an urgent need for active height lifting, pitch and roll attitude adjustment when passing through extreme off-road terrains. However, when driving on extreme off-road terrains, unsatisfactory wheel load distribution is easy to occur, even some wheels are suspended or overloaded, which in turn causes insufficient adhesion and traction, and severe vehicle body vibration, hence seriously affecting the passability, maneuverability, and stability. If active control of vehicle height, attitude, and wheel load distribution can be achieved synchronously, it will greatly improve the passability, maneuverability, and stability of vehicles under extreme off-road terrains.

U.S. Pat. No. 9,884,532 B2 discloses a suspension control device for vehicles. The system detects bosses on the road ahead through pre-inspection sensors, then controls the actuator to rotate the wheels around the boss corner to climb up the boss, instead of pressing on the boss corner to climb up the boss. The method established a 2-DOF vibration model for a single wheel associated suspension and vehicle body, and calculates the driving force that needs to be applied to the actuator when a certain wheel steps onto the boss. The shortcomings of applying this solution or system to the specific object of this disclosure are: Firstly, the contribution of the elastic deformation of the vehicle body to the vehicle attitude and wheel loads is not considered. Secondly, the impact of the single-wheel action on the vehicle attitude and other wheel loads is not considered, so when multi-axle vehicles adopt this scheme to pass through a boss, vehicle height, attitude, and wheel load errors will occur. Thirdly, this scheme cannot achieve compound vehicle height, attitude, and wheel load distribution control in off-road terrain traveling.

U.S. patent Ser. No. 11/142,186 B2 discloses an active safety suspension system. By commanding a coordinated control of a plurality of actuators, the system actively controls wheel force in at least three of four suspension quadrants to maintain optimal contact with the road while implementing ride height adjustments. For a four-wheel vehicle constrained by its mechanical equilibrium relationship, both the normal force distribution between wheels of the front and rear axle, and the normal force distribution between wheels of the left and right side, are completely determined. Hence the active lifting of any wheel will cause a certain decrease in its normal force and a lower in the body height of the corresponding axle, and the forces of other wheels can be approximately determined. Therefore, the control of wheel loads and ride height for four-wheel vehicles in numerous embodiments of this patent can be effectively implemented. The shortcomings of applying this solution or system to the specific object of this disclosure are: due to the statically indeterminate characteristics of multi-axle vehicles, the lifting of any wheel will cause uncertain vehicle height and attitude change, and the load redistribution of all wheels, this scheme is not suitable for vehicles with more than two axles.

CN Pat. No. 110901325 A discloses an active suspension control method and system. This scheme first measures an S-meter road surface in front of the vehicle and estimates the attitude that the vehicle should maintain on the road surface. Secondly, calculates the attitude compensation value when the vehicle reaches the S-meter road surface based on the current body attitude expectations. Thirdly, using a dual closed-loop control algorithm to send control commands to the suspension, and by changing the relative height of each wheel and frame, the vehicle's attitude approaches the expected attitude. The shortcomings of applying this solution or system to the specific object of this disclosure are: Firstly, this method takes the expected attitude of future terrain and current attitude status as deviation, and implements feedback control, the control effect for off-road terrain traveling cannot be guaranteed. When passing through extremely harsh off-road terrains, the control effect cannot be achieved at all. Secondly, this method cannot achieve a synchronous control of vehicle height, attitude, and wheel load distribution.

U.S. 2019/0359025 A1 discloses an active suspension control system and control method for no-road vehicles. The suspension obtains vehicle and road characteristics, and detects vehicle pitch and roll states through sensors to determine whether the vehicle exceeds a leveling threshold; when the vehicle exceeds the leveling threshold, an electronic controller controls the pressure in the adjustable suspension spring cavity for the leveling control of the vehicle, hence corrects the pitch and roll of the vehicle. When the vehicle is horizontal, the pressure sensor detects whether the pressure in the adjustable suspension spring cavity exceeds a threshold, and judges whether it is necessary to adjust the pressure in each cavity to make the pressure in each wheel basically equal. The shortcomings of applying this solution or system to the specific object of this disclosure are: The leveling control and pressure balance control of this control system act alternately, while the synchronous control of vehicle attitude and wheel loads is not conducted.

AU Pat. No. 2022296361 A1 discloses an active suspension inertia regulation method based on a scanned vehicle-front terrain and a control system thereof. The method first calculating the trajectory of the center of mass and the attitude history of a vehicle traveling through the vehicle-front terrain with passive suspension. Secondly, based on smoothing the trajectory of the center of mass and the attitude history, calculating the suspension displacement history and suspension load history of the vehicle traveling through the vehicle-front terrain with active suspension. Finally, controlling the active suspension to keep the vehicle travels according to the smoothed trajectory and load expectation. The shortcomings of applying this solution or system to the specific object of this disclosure are: Firstly, the dynamic differential equation-based vehicle dynamic model is based on the assumption of small deformations, and cannot be adopted in extremely harsh off-road terrain traveling. Secondly, the dynamic model is based on rigid body assumption, so the contribution of vehicle deformation cannot be considered. Thirdly, the active suspension displacement and suspension load are achieved by sequential calculation, in which the vehicle stiffness is simplified, hence cumulative errors and time-consuming calculations are inevitable. It can be seen that the current active suspension system and control method mainly concerns active control of vehicle height and attitude under general off-road terrains, which can produce a certain effect of improving mobility and stability. However, the current technology has not yet realized the synchronous control of vehicle height, attitude, and wheel load distribution for multi-axle vehicles under extreme off-road terrains.

The bottleneck lies in the fact that a multi axle vehicle is a statically indeterminate or even higher-order statically indeterminate system. The body height, attitude and wheel loads of a vehicle have complex coupling characteristics, that is, any small active adjustment of an active actuator may lead to complex changes in the height and attitude of the vehicle body, as well as the redistribution of all wheel loads. The more axles there are, the more complex the coupling characteristics are, and the greater the difficulty in achieving the expected control effect.

SUMMARY OF THE INVENTION

The present disclosure proposes an active suspension vehicle and control method to implement synchronous vehicle height, attitude, and wheel load distribution control. The control method is based on the premise of accurately characterizing the inherent load-bearing and deformation coupling properties of the vehicle, i.e. the load and deformation joint control matrix. In the traveling, the vehicle firstly pre-calculates the passive responses of the vehicle height, attitude, and wheel loads at the next moment. Then determines the vehicle height, attitude, and feasible wheel load expectations at the said next moment, and inverse-calculates the active suspension adjustment stroke required to achieve the vehicle height, attitude, and feasible wheel load expectations when the vehicle drives to the corresponding road features at the said next moment. Finally, the vehicle traveling and active suspension adjustment are controlled simultaneously. Ideally, a vehicle with any number of axles can simultaneously achieve the stated vehicle height, attitude, and feasible wheel load expectations when passing through extreme off-road terrains, thus significantly improving its passability, maneuverability, and stability.

In some embodiments, the active suspension vehicle and control method disclosed herein may include:

a vehicle body;

a wheel carriage assembly, comprising two or more axles and a plurality of wheels associated therewith, with the wheel carriage assembly being connected to the vehicle body and operable to lift and rotate each of the two or more axles relative to the vehicle body;

an active suspension system, comprising a plurality of active actuators and shock absorbers, each shock absorber is connected at one end to the vehicle body and at the other end to an active actuator, which in turn is connected at its opposite end to the wheel carriage assembly, and the active actuator being operable to extend and shorten along its axis; and a sensing system, comprising a front-road preview system, a body state measurement system, a vehicle speed measurement system, a driving measurement system; and a control system, with the sensing system and the active suspension system being connected to the control system as input end and output end, respectively.

The control method comprises the following steps:

Firstly, setting a Cartesian coordinate system defined with a center of mass of the vehicle body as an origin, an x-axis parallel to an axis of the vehicle body and pointing in a driving direction of the active suspension vehicle, a z-axis pointing vertically upward, and a y-axis perpendicular to the longitudinal plane of symmetry of the active suspension vehicle and pointing to the left side of the driving direction, the total weight of the body is denoted as G. Each of the plurality of the active actuators being denoted with a corresponding subscript number with each of the plurality of the wheels.

Next, building a load and deformation joint control matrix of the active suspension vehicle and storing the load and deformation joint control matrix in the control system by the following steps: placing the active suspension vehicle on a horizontal and low roughness road; driving a j-th active actuator of the plurality of active actuators comprised in the active suspension system, j=1, 2, . . . n, to actively extend with other active actuators of the plurality of active actuators remaining inactive, measuring a displacement of each of the plurality of the active actuators in real-time via a corresponding displacement sensor of the body state measurement system until a unit displacement being generated; measuring a load increment of each of the plurality of the wheels via a corresponding force sensor of the body state measurement system; storing the load increment of each of the plurality of the wheels in order from 1 to n in rows 1 ton of the j-th column of a matrix as $\Delta f_{1j}, \Delta_{2j}, \ldots, \Delta f_{nj}$.

At the same time, measuring increments of a roll angle and a pitch angle of vehicle body via an attitude sensor of the body state measurement system, and storing angle increments in rows n+1 to n+2 of the j-th column of the matrix as $\Delta\theta_{xj}; \Delta\theta_{yj}$; performing said measuring and said storing until the load and deformation joint control matrix being constructed and stored in the control system as follows:

$$\left[\frac{K}{T}\right]_{(n+2)\times n} = \begin{bmatrix} \Delta f_{11} & \cdots & \Delta f_{1j} & \Delta f_{1n} \\ \Delta f_{21} & \ddots & \Delta f_{2j} & \Delta f_{2n} \\ \vdots & \vdots & \vdots & \vdots \\ \Delta f_{n1} & \cdots & \Delta f_{nj} & \Delta f_{nn} \\ \Delta\theta_{x1} & \cdots & \Delta\theta_{xj} & \Delta\theta_{xn} \\ \Delta\theta_{y1} & \cdots & \Delta\theta_{yj} & \Delta\theta_{yn} \end{bmatrix}_{(n+2)\times n} \quad (1)$$

In some embodiments, the unit displacement is in the range of 1% to 10% of maximum stroke of the active actuator. In some embodiments, the load and deformation joint control matrices will be stored in the control system for the pre-calculation equation for passive responses of vehicle attitude and wheel loads and the inverse-calculation equation for active suspension adjustment to call.

Next, measuring the roll angle and the pitch angle of the vehicle body at a present moment in an actual road traveling via the attitude sensor of the body state measurement system; measuring the load of each of the plurality of the wheels at the present moment via the corresponding force sensor of the body state measurement system, and constructing an array of wheel loads at the present moment $[F_1{}^c \ldots F_i{}^c \ldots F_n{}^c]^T$.

Next, the control system determines a vertical height excitation array $[d_1 \ldots d_i \ldots d_n]^T$ by calling a front-road preview system and a path planning procedure that each of the plurality of the wheels will be subjected to at the next moment of the present moment based on the upcoming vertical displacement excitation data, and calculating an average value of the vertical height excitation array $\bar{d}$. In some embodiments, the value of the unit time interval between the present moment and the next moment is determined by the control system according to the complexity of the road features on an upcoming driving route.

Next, determining by the control system, a vehicle height expectation and vehicle pitch and roll attitude expectations for the active suspension vehicle driving on the road with road features corresponding to the vertical height excitation array at the next moment.

At the same time, setting wheel load distribution expectations $F_i{}^s$, i=1, 2, . . . n, for the next moment, and determining feasible wheel load expectations by the following steps: firstly, solving initial wheel load expectations $F_i{}^{*1}$, i=1, 2, . . . n, by taking minimum mean square deviation between wheel loads and the wheel load distribution expectations as an optimization objective, and mechanical equilibrium conditions as constraints. Since this method takes the minimum mean square deviation of all wheel loads as the optimization objective, the result of the solution may not be able to obtain the global optimal solution for some special wheel load distribution expectations, so it is further optimized. Then, taking the initial wheel load expectations $\{F_i{}^{*1}\}^*$ as initial value of optimization, setting an effective optimization range for the load of each of the plurality of the wheels, and taking mechanical equilibrium conditions as constraints, continuing optimization to calculate the feasible wheel load expectations $F_i{}^*$, i=1, 2, . . . n, for the active suspension vehicle driving on the road with road features corresponding to the vertical height excitation array at the next moment.

Next, constructing a pre-calculation equation for passive responses of vehicle attitude and wheel loads based on the load and deformation joint control matrix, the roll angle, the pitch angle, and the array of wheel loads at the present moment, and the vertical height excitation array, as follows:

$$\begin{bmatrix} F_i^y \\ \theta_j^y \end{bmatrix}_{(n+2)\times 1} = \begin{bmatrix} K \\ T \end{bmatrix}_{(n+2)\times n} \{d_i\}_{n\times 1} + \begin{bmatrix} F_i^c \\ \theta_j^c \end{bmatrix}_{(n+2)\times 1}, \tag{2}$$

wherein, $F_i^y$, i=1, 2, . . . n being the pre-calculated load increments that each of the plurality of the wheels will be subjected to when the active suspension vehicle driving on the road with road features corresponding to the vertical height excitation array at the next moment; $\theta_j^y$, j=x, y being the pre-calculated roll angle and pitch angle increments that the vehicle body will generate when the active suspension vehicle driving on the road with road features corresponding to the vertical height excitation array at the next moment; and the average value $\bar{d}$ being the height increment that the vehicle body will generate at the next moment.

In some embodiments, the control system will select matrix elements under corresponding unit displacement excitation of the vertical height excitation array of wheels that will be subjected at a next moment of the present moment, and then performs the pre-calculation and the inverse-calculation.

Solving equation (2) to obtain passive responses of vehicle attitude and wheel loads.

Next, constructing an inverse-calculation equation for active suspension adjustment based on the load and deformation joint control matrix, the passive responses of vehicle attitude and wheel load, and the vehicle attitude expectations and the feasible wheel load expectations $$\begin{bmatrix} K \\ T \end{bmatrix}_{(n+2)\times n} \{a_i\}_{n\times 1} = \left\{ \begin{array}{c} F_i^* - F_i^y \\ \theta_j^* - \theta_j^y \end{array} \right\}_{(n+2)\times 1}, \tag{3}$$

wherein, $\theta_j^*$, j=x, y, being the vehicle attitude expectations;

Next, solving equation (3) to obtain a basic array of active suspension adjustment $[a_1 \ldots a_i \ldots a_n]^T$, and calculating an average value $\bar{a}$. Subtracting the average value $\bar{a}$ from the basic array of active suspension adjustment, and compensating the vehicle height expectation $a_h$ to obtain a following equation $$\{a_i^*\}_{n\times 1} = \{a_i\}_{n\times 1} - \bar{a} + a_h. \tag{4}$$

Next, solving equation (4) to obtain a modified array of active suspension adjustment $[a_1{}^*, \ldots a_i{}^*, \ldots a_n{}^*]^T$ that synchronously achieving the vehicle height expectation, the vehicle attitude expectations, and the feasible wheel load expectations when the active suspension vehicle driving on the road with road features corresponding to the vertical height excitation array at the next moment;

Next, controlling the active suspension vehicle to drive on the road with road features corresponding to the vertical height excitation array at the next moment, and in the meanwhile controlling each of the plurality of the active actuators to implement the active suspension adjustment, thus synchronously completing the active adjustment of the modified array of active suspension adjustment at the next moment; hence achieving a synchronous and active control of vehicle height, attitude, and wheel load distribution in a time interval between the present moment and the next moment;

Finally, judging whether the active suspension vehicle has passed the extreme off-road terrain by the subjective decision of the driver or the objective decision of the controller based on the road characteristics: if yes, terminating the active control; and if no, go back to step 3, resolving the active suspension adjustment stroke and performing cyclic control until the active suspension vehicle passes the extreme off-road terrain.

The front-road preview system comprises at least a Lidar which transmits the point cloud data of the actual road in front of the active suspension vehicle within a longitudinal distance from the wheels of a first axle to at least one times of vehicle length to the control system;

The body state measurement system comprises at least one attitude sensor transmits the roll angle, the pitch angle, a yaw angle of the vehicle body and their corresponding angular velocities and angular accelerations to the control system, force sensors transmit a supporting load of each of the plurality of the active actuators to the control system, according to which the load of the corresponding wheel is calculated as a function of the supporting load, the corresponding displacement sensor transmit a telescopic displacement of each of the plurality of the active actuators to the control system, according to which the vehicle height is calculated as a function of the telescopic displacement;

The vehicle speed measurement system comprises wheel speed sensors installed on the wheels on at least both sides of the front and rear axles, and is matched with corresponding force sensors on each of the plurality of the active actuators; the vehicle speed measurement system transmits the calculated driving speed of the active suspension vehicle to the control system based on wheel speed of loaded wheels;

The driving measurement system transmits driver's inputs at least from steering wheel, throttle, brake to the control system, and in combination with body state and motion parameters measured by the body state measurement system and the vehicle speed measurement system, to determine future driving and steering parameters. It is worth noting that the sensing system is not limited to the currently described configuration. The instruments, equipment and methods for obtaining the required signals in any manner shall be included within the scope of the claims.

The control system determines the relationship between the upcoming driving route and driving time of each wheel by joint planning of the body state measurement system, the front-road preview system, the vehicle speed measurement system, and the driving measurement system, according to the joint planning of the control system, an upcoming vertical displacement excitation data of each wheel is defined as a data array of the road features and the driving time on the upcoming driving route.

The future expectations of vehicle height, attitude, and wheel load distribution of the active suspension vehicle is a predefined data array that adapts to the road features of the upcoming driving route, and is determined by the control system based on the road features and driving time of the upcoming driving route, as well as the current vehicle height, attitude, and wheel loads of the vehicle body.

The active suspension system acts as an output end of the control system. The telescopic adjustment stroke of the active actuator is determined by the control system calling the control method. The active telescopic adjustment of the active actuator is implemented in driving so that when the active suspension vehicle driving on the upcoming driving route, the vehicle height and attitude will chase the vehicle height and attitude expectations in real-time, while at the same time, the wheel load distribution of each wheel will chase feasible wheel load expectations synchronously. It is worth noting that we have no restrictions on the types of the active actuator.

The active actuator can be driven by a fluid system or an electromechanical system. When the fluid system is used for actuating, the fluid can be either a hydraulic fluid or a compressed gas.

The beneficial effects of the present disclosure are as follows:

The active suspension vehicle and control method first solves the passive responses of vehicle height, attitude, and wheel load distribution under upcoming road excitation, and then solves the adjustment length of each active actuator based on the vehicle height, attitude, and wheel load expectations for the upcoming road excitation. For that the scheme is constructed based on the inherent load-bearing and deformation coupling characteristics of the vehicle, the mechanical essence of body deformation and system coupling is fully considered, thus it can accurately achieve the vehicle height, attitude, and wheel load expectations by one-time adjustment. In principle. The control method effectively avoids the time consumption, oscillation, and slow convergence caused by repeated measurements, cyclic judgments, and iterative control in the referenced schemes. At the same time, it avoids the huge perceptual power, computational power, and response speed required for artificial intelligence control, thus it is a cost-effective, efficient, and reliable control method.

EMBODIMENTS

In order to make the purpose, technical solutions, and advantages of the present disclosure more clear, the disclosure will be further described in detail with the attached drawings and embodiments.

Figure 1:
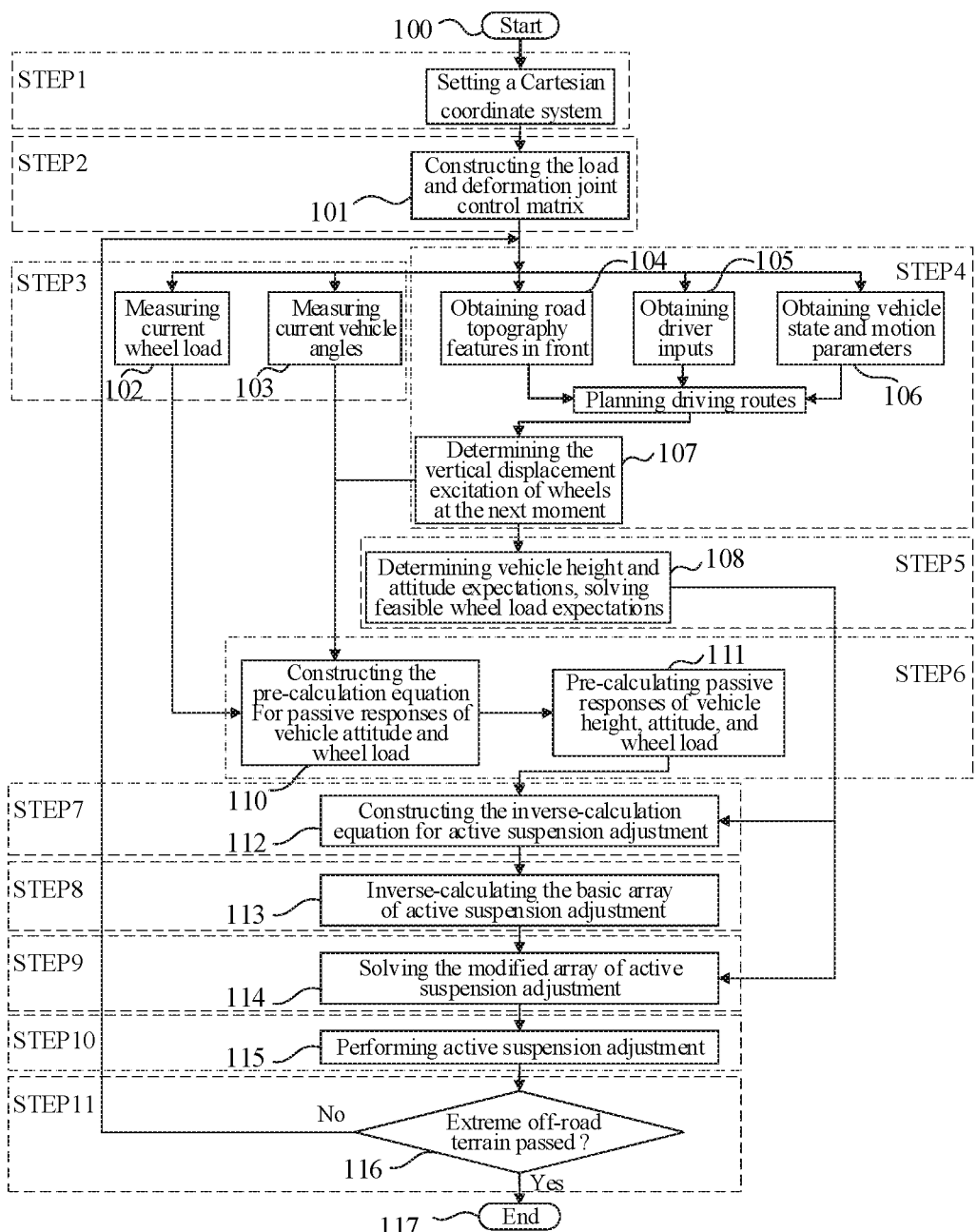
FIG. 1 is a flow chart of the control method for the present disclosure active suspension vehicle and control method.
Figure 2:
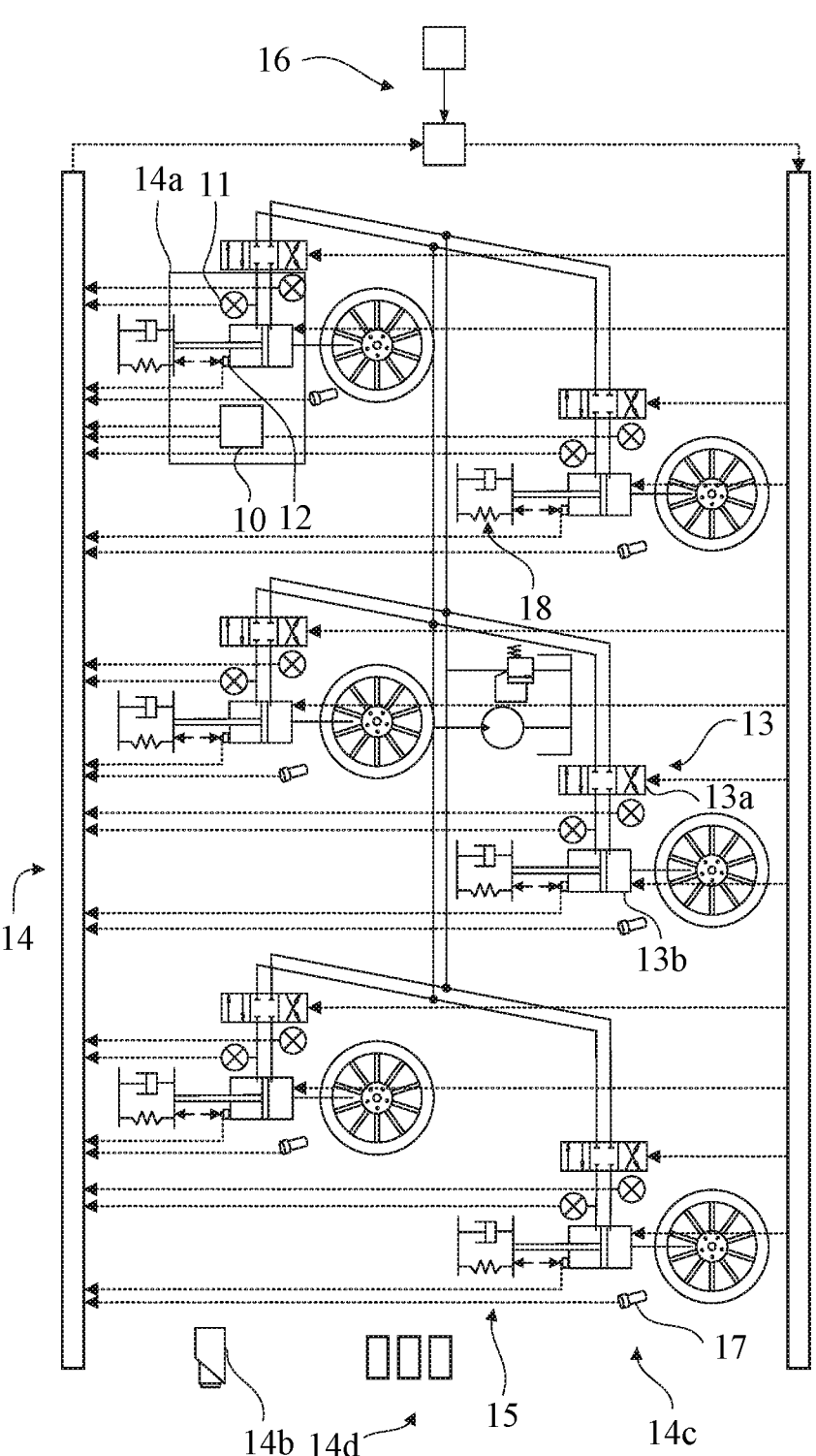
FIG. 2 is a schematic diagram of the active suspension vehicle for the present disclosure active suspension vehicle and control method.
Figure 3:
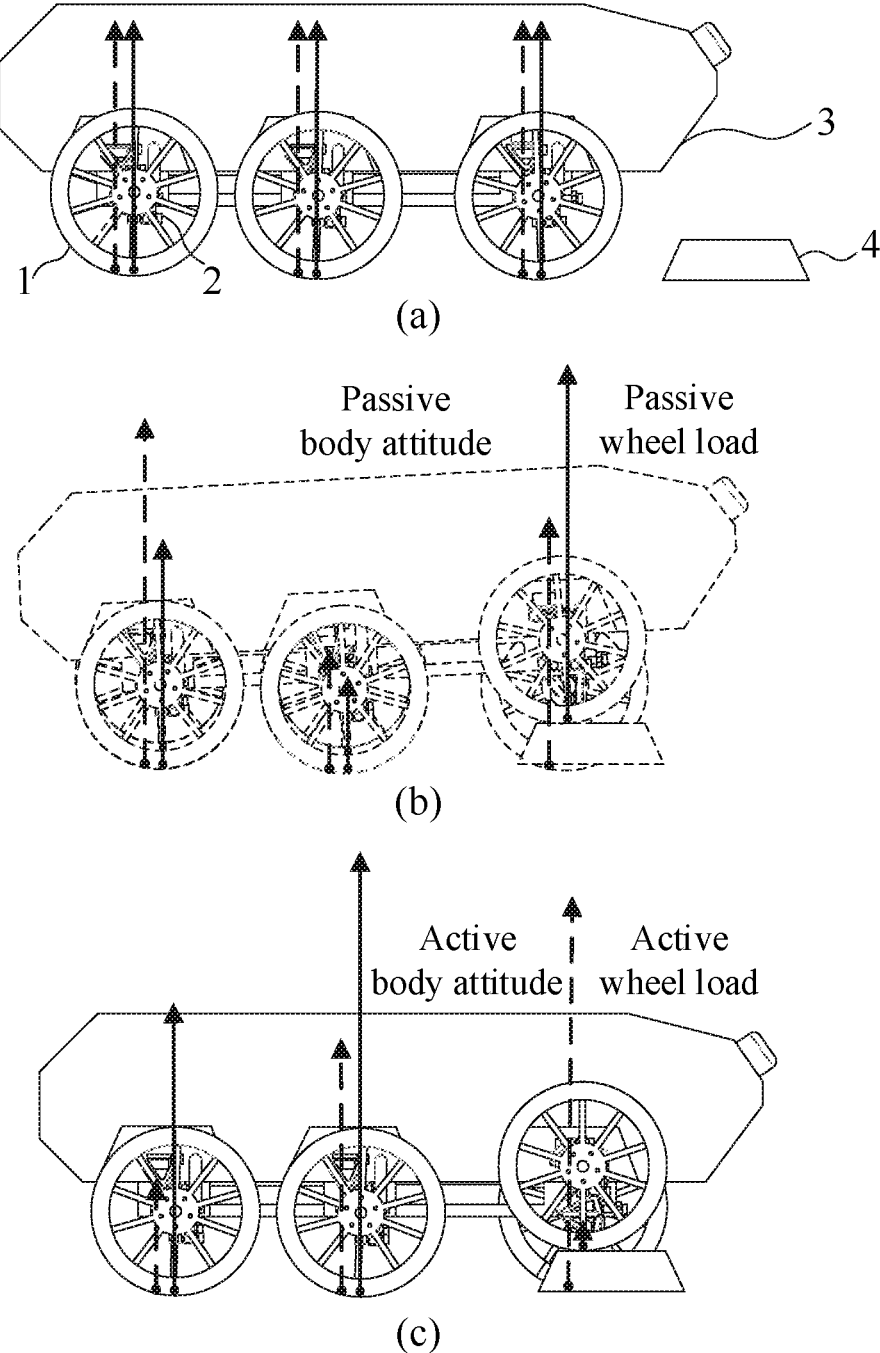
FIG. 3 is a schematic diagram of the vehicle height, attitude, and wheel loads control process for the present disclosure active suspension vehicle and control method when the right front wheel of the active suspension vehicle steps onto a boss.

The following contents, in particular, take the active suspension system, sensing system, and control system of a three-axle independent active suspension vehicle shown in FIGS. 2 and 3, and the flow chart of the control method shown in FIG. 1 as examples to illustrate the active suspension vehicle and control method. It is understood that the specific embodiments described herein are meant only to explain the present disclosure. The present disclosure is not limited to the specific implementation methods such as the active suspension system, the sensing system, and the control system used in the specific embodiments.

As shown in FIGS. 2 and 3, wheels 1 and axles 2 of the active suspension vehicle are connected to body 3 through the active suspension system 15. The sensing system 14 and the active suspension system 15 are the input and output ends of the control system 16, respectively. The number of axles 2 of the active suspension vehicle may have any number of axles of two or more. Each wheel 1 is equipped with one active actuator 13 and one shock absorber 18 of the active suspension system 15. The active actuators 13 are operable to extend and shorten along an axis of the active actuator and are assigned serial numbers 1 to n, respectively. The sensing system 14 comprises a body state measurement system 14a, a front-road preview system 14b, a vehicle speed measurement system 14c, and a driving measurement system 14d. A person skilled in the art should be aware that the active actuator 13 may be driven by a fluid system or an electromechanical system; when a fluid system is used for actuating, the fluid may be either a hydraulic fluid or a compressed gas. Thus, FIG. 2 shows only one embodiment with a fluid sealing chamber 13b and a solenoid directional valve assembly 13a as the active actuator 13.

The body state measurement system 14a comprises attitude sensor 10 measuring the roll angle, the pitch angle, and the yaw angle of the body 3, and their corresponding angular velocities and angular accelerations; force sensors 11 measuring a supporting load (use two force sensors 11 measuring the pressure of each fluid line of each fluid sealing chamber 13b, and calculating the absolute value of the fluid line load difference based on the areas of the fluid sealing chamber 13b with and without the rod, and then calculating the current supporting load of the corresponding active actuator) of each of the plurality of the active actuators 13, according to which the wheel loads is defined as a function of the supporting load; a displacement sensor 12 measuring a telescopic displacement of each of the plurality of the active actuators 13, according to which the vehicle height is defined as a function of the telescopic displacement. A person skilled in the art should be aware that the force sensor 11, the displacement sensor 12, and attitude sensor 10 included in the body state measurement system 14a are limited to this embodiment configuration, there are various configurations and methods to obtain the body state parameters obtained by the body state measurement system 14a, and these different configurations and methods are also within the scope of the present disclosure.

The front-road preview system 14b comprises sensors measuring road features within a longitudinal distance from the wheels of a first axle to at least one time of vehicle length, and within a horizontal view range of at least 1200 degrees along the longitudinal front of the vehicle. A person skilled in the art should be aware that the front-road preview system 14b can be combined in many different ways, for example, a laser radar can be used to scan the point cloud array of the front road, a machine vision method can be used to obtain the road features in front. These different methods and their combinations are also within the scope of the present disclosure.

The vehicle speed measurement system 14c comprises wheel speed sensors 17 installed on wheels on both sides of the front and rear axles, and is matched with corresponding force sensor 11 on each wheel; the system 14c determines whether a wheel is unloaded and sliding based on signals of the corresponding force sensors 11, then determines the driving speed of the vehicle based on wheel speed of loaded wheels. A person skilled in the art should be aware that the wheel speed sensor 17 currently of the vehicle speed measurement system 14c is only a minimum configuration, and with the increase in the number of axles more wheel speed sensors 17 can be used for accurately determining the driving speed of the vehicle.

The driving measurement system 14d comprises sensors measuring the driver's inputs from the steering wheel, throttle, brake, etc, and in combination with body state and motion parameters measured by the body state measurement system 14a and vehicle speed measurement system 14c, to determine future driving and steering parameters. A person skilled in the art should be aware that the driving measurement system 14d is used to obtain the vehicle state and motion parameters such as the wheel angle and steering wheel angle, and the way of obtaining each parameter is not limited by the present disclosure, for example, different ways of obtaining the wheel angle and the steering wheel angle such as using angle sensors for direct measurement or calculating by motion parameters are also within the scope of the present disclosure.

The control system 16 determines the relationship between the upcoming driving route and the driving time of each wheel by joint planning of the body state measurement system 14a, the front-road preview system 14b, the vehicle speed measurement system 14c, and the driving measurement system 14d. According to the joint planning of the control system, an upcoming vertical displacement excitation data of each wheel is defined as a data array of the road features and the driving time on the upcoming driving route.

The future expectations of vehicle height, attitude, and wheel load distribution of the active suspension vehicle is a predefined data array that adapts to the road features of the upcoming driving route, and is determined by the control system 16 based on the road features and driving time of the upcoming driving route, as well as the current vehicle height, attitude, and wheel loads of the body 3.

Based on the above hardware configuration of the active suspension vehicle, the control system 16 will invoke the control method to determine the telescopic adjustment stroke of the active actuator 13. The active telescopic adjustment of the active actuator 13 is implemented in driving so that when the vehicle driving on the upcoming driving route, the vehicle height and attitude chase vehicle height and attitude expectations in real-time, while at the same time, wheel load distribution of each wheel chases feasible wheel load expectations synchronously and in real-time. In order to elaborate the control method, it is necessary to define the center of mass of the body 3 as the origin of the Cartesian coordinate system, the x-axis parallel to the ground and points in the driving direction of the vehicle, the z-axis points vertically upward, the y-axis perpendicular to a longitudinal plane of symmetry of the active suspension vehicle and pointing to the left side of the driving direction. The longitudinal and transverse coordinates of each wheel are in turn denoted as $(x_i, y_i)$, i=1, 2, . . . n. The serial number of the wheel is in the same order as the serial number of the active actuator 13. The total weight of the body 3 is noted as G. The specific steps of the control method are as follows:

Step 101, constructing a load and deformation joint control matrix of the active suspension vehicle and storing the load and deformation joint control matrix in the control system 16 by the following steps: placing the active suspension vehicle on a horizontal road; driving a j-th active actuator 13 of the active suspension system 15, j=1, 2, . . . n, to actively extend with other active actuators 13 remaining inactive, measuring a displacement of the active actuator 13 in real-time via a corresponding displacement sensor 12 of the body state measurement system until a unit displacement being generated; measuring a load increment of each of the plurality of the wheels via a corresponding force sensor 11 of the body state measurement system; storing the load increment of each of the plurality of the wheels in order from 1 to n in rows 1 to n of the j-th column of a matrix as $\Delta f_{1j}, \Delta f_{2j}, \ldots \Delta f_{nj}$.

At the same time, measuring increments of a roll angle and a pitch angle of vehicle body via an attitude sensor of the body state measurement system, and storing angle increments in rows n+1 to n+2 of the j-th column of the matrix as $\Delta\theta_{xj}, \Delta\theta_{yj}$; performing said measuring and said storing until the load and deformation joint control matrix being constructed and stored in the control system as follows:

$$\begin{bmatrix} K \\ T \end{bmatrix}_{(n+2)\times n} = \begin{bmatrix} \Delta f_{11} & \Delta f_{12} & \ldots & \Delta f_{1n} \\ \Delta f_{21} & \Delta f_{22} & \ldots & \Delta f_{2n} \\ \vdots & \vdots & \vdots & \vdots \\ \Delta f_{n1} & \Delta f_{n2} & \ldots & \Delta f_{nn} \\ \Delta\theta_{x1} & \Delta\theta_{x2} & \ldots & \Delta\theta_{xn} \\ \Delta\theta_{y1} & \Delta\theta_{y2} & \ldots & \Delta\theta_{yn} \end{bmatrix}_{(n+2)\times n} \quad (3)$$

Step 102, measuring the current wheel loads. Measuring the pressure of each fluid line of each fluid sealing chamber 13b using the force sensor 11, and calculating the absolute value of the fluid line load difference based on the areas of the fluid sealing chamber 13*b* with and without the rod; then calculating the current load of the corresponding wheel $F_i^c$ $$F_i^c = |P_1 S_1 - P_2 S_2|. \qquad (4)$$

wherein, $P_i$ is the fluid line pressure of the rod chamber, $S_1$ is the area of the rod chamber, $P_2$ is the fluid line pressure of the rodless chamber, and $S_2$ is the area of the rodless chamber.

Step 103, measuring the roll angle $\theta_x^c$ and the pitch angle $\theta_y^c$ of the vehicle body 3 at the present moment in an actual road via the attitude sensor 10.

Step 104, using the front-road preview system 14*b* to measure the road features within a longitudinal distance from the wheels of a first axle to at least one times of vehicle length, and within a horizontal view range of at least 1200 degrees along the longitudinal front of the vehicle.

Step 105, detecting the driver's inputs at least from the steering wheel, the throttle, the brake.

Step 106, obtaining the vehicle state and motion parameters based on the body state measurement system 14*a*, the vehicle speed measurement system 14*c*, and the driving measurement system 14*d*.

Step 107, planning the upcoming driving route based on the road features in front obtained in the step 104, the driver inputs detected in the step 105, and the vehicle state and motion parameters obtained in the step 106. Then defining the upcoming vertical displacement excitation of each wheel as a data array of the road features and the driving time on the upcoming driving route.

Step 108, determining the vehicle height and attitude expectations and solving the feasible wheel load expectations. The control system 16 predefines the vehicle height expectation and the vehicle attitude expectations of the active suspension vehicle based on the road features and the driving time on the upcoming driving route described in the step 107. Wherein, the vehicle height and attitude expectations can be set according to different practical requirements. At the same time, the control system 16 should also predefines wheel load distribution expectations $F_i^s$ that are adapted to the road features on the upcoming driving route, and determines the feasible wheel load expectations by the following steps:

firstly, initial wheel load expectations $F_i^{*1}$, i=1, 2, . . . n is solved by taking the minimum mean square deviation between the wheel loads $F_i$ and the wheel load distribution expectations $F_i^s$ as the optimization objective, and mechanical equilibrium conditions as constraints, based on the following equation $$\begin{cases} \min \dfrac{1}{2}\sum_{i=1}^{n}(F_i - F_i^s)^2 \\[2mm] F_i^s = F_i^*(i = mand\ \text{load}); F_i^s = \dfrac{G}{n-p}(i = non-mand\ \text{load}) \\[2mm] \text{s.t.} \\[2mm] \sum_{i=1}^{n}F_i = G \\[2mm] \sum_{i=1}^{n}F_i x_i = 0 \\[2mm] \sum_{i=1}^{n}F_i y_i = 0 \end{cases} \qquad (5)$$

wherein, $F_i^s = F_i^*$ is the mandatory wheel load expectations set for certain focused wheels, and $$F_i^s = \frac{G}{n-p}$$

is the uniformity wheel load expectations set for the other general wheels, wherein P is the number of wheels with mandatory wheel load distribution.

$$\sum_{i=1}^{n}F_i = G, \quad \sum_{i=1}^{n}F_i x_i = 0,$$

and $$\sum_{i=1}^{n}F_i y_i = 0$$

are the vertical force equilibrium constraint for the vehicle, and the torque equilibrium constraints around the x-axis and around the y-axis, respectively.

The initial wheel load expectations $F_i^{*1}$ for each wheel can be obtained by solving the equation (5). However, since this method takes the minimum mean square deviation of all wheel loads as the optimization objective, the result of the solution may not be able to obtain the global optimal solution for some special wheel load distribution expectations, so it should be further optimized. Therefore, taking the initial wheel load expectations $F_i^{*1}$ as initial value of optimization, setting the effective optimization range of wheel loads which is $0 \leq F_i \leq F_i^{*1}$ for certain focused wheels, and coefficients $\alpha$ and $\beta$ (e.g. 0.5 and 1.5) are superimposed on the solution of Eq.(5) to form the space $\alpha F_i^{*1} \leq F_i \leq \beta F_i^{*1}$ for general wheels, still taking the mechanical equilibrium conditions as constraints, to invoke the optimization algorithm to solve for the feasible wheel load expectations $F_i^*$, i=1, 2, . . . n, for driving on the road features of the vertical height excitation array at the next moment. Step 109, setting a unit time interval with the present moment as the time starting point, and picking up the vertical height excitation array $[d_1 \ldots d_i \ldots d_n]^T$ that each wheel will be subjected at a next moment of the present moment based on the upcoming vertical displacement excitation data array of each wheel described in the step 107; and calculating the average value d of the vertical height excitation array.

Wherein the unit time interval, the value of which is determined by the control system 16 according to the complexity of the road features on the upcoming driving route.

Step 110, constructing the pre-calculation equation for passive responses of vehicle attitude and wheel loads. Constructing the pre-calculation equation for passive responses of vehicle attitude and wheel loads without control based on the load and deformation joint control matrix obtained in the step 101, the wheel loads at the present moment obtained in the step 102, the roll angle and the pitch angle of the body 3 at the present moment obtained in the step 103, and the vertical height excitation array obtained in the step 108

$$\begin{bmatrix} F_i^v \\ \theta_j^v \end{bmatrix}_{(n+2)\times 1} = \begin{bmatrix} K \\ T \end{bmatrix}_{(n+2)\times n} \{d_i\}_{n\times 1} + \begin{bmatrix} F_i^c \\ \theta_j^c \end{bmatrix}_{(n+2)\times 1}, \qquad (6)$$

wherein the control system selecting matrix elements under corresponding unit displacement excitation of the vertical height excitation array of wheels that will be subjected at a next moment of the present moment, and then performs the pre-calculation.

Step 111, solving ahead of time the passive responses of the vehicle height, attitude, and wheel loads. Solving the pre-calculation equation for passive responses of vehicle attitude and wheel loads constructed in the step 110 to obtain the vehicle height, attitude, and wheel loads when driving on the road with road features of the vertical height excitation array at the next moment. In equation (5), $F_i^y$, i=1, 2, . . . n is the pre-calculated load that each of the plurality of the wheels will bear when driving on the road with road features of the vertical height excitation array at the next moment. $\theta_j^y$, j=x, y is the pre-calculated roll angle and pitch angle that the body 3 will generate when driving on the road with road features of the vertical height excitation array at the next moment. the average value $\overline{d}$ of the vertical height excitation array in the step 109 is the height increment that the body 3 will generate when driving on the road with road features of the vertical height excitation array at the next moment.

Step 112, constructing the inverse-calculation equation for active suspension adjustment. Constructing the inverse-calculation equation for active suspension adjustment based on the load and deformation joint control matrix obtained in the step 101, the passive responses of vehicle attitude and wheel loads at the next moment obtained in the step 111, and the vehicle attitude expectations and the feasible wheel load expectations at the next moment obtained in the step 111

$$\left[\begin{array}{c} K \\ T \end{array}\right]_{(n+2)\times n} \{a_i\}_{n\times 1} = \left\{\begin{array}{c} F_i^* - F_i^y \\ \theta_j^* - \theta_j^y \end{array}\right\}_{(n+2)\times 1}, \qquad (7)$$

wherein, $\theta_j^*$, j=x, y, is the stated vehicle attitude expectations. Wherein the control system selecting matrix elements under corresponding unit displacement excitation of the vertical height excitation array of wheels that will be subjected at a next moment of the present moment, and then performs the inverse-calculation.

Step 113, solving the inverse-calculation equation for active suspension adjustment constructed in the step 112 to obtain the basic array of active suspension adjustment $[a_1 \ldots a_i \ldots a_n]^T$, and calculating its average value $\overline{a}$.

Step 114, subtracting the average value $\overline{a}$ from the basic array of active suspension adjustment, and compensating the vehicle height expectation $a_h$ described in the step 111, to obtain the active suspension adjustment stroke, which satisfies $$\{a_i^*\}_{n\times 1} = \{a_i\}_{n\times 1} - \overline{a} + a_h. \qquad (8)$$

Solving equation (8) yields the modified array of active suspension adjustment $[a_1^* \ldots a_i^* \ldots a_n^*]^T$ that synchronously achieves the vehicle height expectation, vehicle attitude expectations, and feasible wheel load expectations when the active suspension vehicle driving on the road with road features of the vertical height excitation array at the next moment.

Step 115, implementing active adjustment of the suspension. The control system 16 controls the active suspension vehicle to drive on the road with road features of the vertical height excitation array at the next moment, and in the meanwhile controls each of the plurality of the active actuators 13 to implement the active telescopic adjustment, thus synchronously completing the active adjustment of the modified array of active suspension adjustment at the next moment, and achieving a synchronous and active control of vehicle height, attitude, and wheel load distribution in a unit time interval.

Step 116, judging whether the vehicle passed the extreme off-road terrain by the subjective decision of the driver or the objective decision of the controller based on the road characteristics: if yes, end the active control; and if no, go back to step 3 and re-perform step 3 based on the constructed load and deformation joint control matrix, resolving the active suspension adjustment stroke and performing cyclic control until the vehicle passed the extreme off-road terrain.

More intuitively, the following is an example of the right front wheel of a three-axle vehicle steps onto the boss 4 to illustrate the specific implementation of the control method:

First, features of the boss 4 is scanned by the front-road preview system 14b as shown in FIG. 3a. For such small bosses, the vertical height excitation array to be applied to each wheel at the next moment is $\{d,0,0,0,0,0\}^T$, wherein d is the height of the vertical displacement excitation acting on the right front wheel. The height, roll angle $\theta_x^c$, pitch angle $\theta_y^c$, and wheel loads array $[F_1^c \ldots F_i^c \ldots F_n^c]^T$ of the vehicle at the present moment are measured by the body state measurement system 14a. The passive responses of the vehicle attitude and wheel loads when the vehicle travels to the right front wheel passively stepping on the boss 4, that is, the state as shown in FIG. 3b, is obtained ahead of time by solving the pre-calculation equation for passive responses of vehicle attitude and wheel loads, which satisfies $$\left[\begin{array}{c} F_i^y \\ \theta_j^y \end{array}\right]_{8\times 1} = \left[\begin{array}{c} K \\ T \end{array}\right]_{8\times 6} \left\{\begin{array}{c} d \\ 0 \\ 0 \\ 0 \\ 0 \\ 0 \end{array}\right\}_{6\times 1} + \left[\begin{array}{c} F_i^c \\ \theta_j^c \end{array}\right]_{8\times 1}. \qquad (9)$$

Then, it is assumed that the control system 16 plans the right front wheel to step on the boss 4 with empty load at the next moment, thus, the wheel load distribution expectation is maintaining the load balance of the other five wheels, and the vehicle height and attitude expectation is maintaining the vehicle height and attitude stable. Define the stable vehicle attitude as the attitude expectations, that is, $\theta_j^*=[0,0]^T$. For the specific size and load characteristics, define the following wheel load distribution expectations according to step 108, that is $F_i^*=\{0, 0.3G, 0.2G, 0.06G, 0.17G, 0.27G\}^T$.

By substituting the passive responses of vehicle attitude and wheel loads, the vehicle attitude and wheel load distribution expectations into the inverse-calculation equation for active suspension adjustment, the active adjustment stroke $\{a_i\}$ of each suspension for the targeted vehicle attitude and wheel load distribution expectation when the right front wheel of the vehicle steps onto the boss 4 can be calculated $$\left[\begin{array}{c} K \\ T \end{array}\right]_{8\times 6} \{a_i\}_{6\times 1} = \left[\begin{array}{c} F_i^* - F_i^y \\ 0 - \theta_j^y \end{array}\right]_{6\times 1}. \qquad (10)$$

Next, calculate the average value $\overline{a}$ of the active adjustment amount $\{a_i\}$. Since the stable vehicle height is defined as the vehicle height expectation, then $a_h=0$. After correction, the modified array of active suspension adjustment $[a_1^* \ldots a_i^* \ldots a_n^*]^T$ is obtained.

Finally, according to the modified array of active suspension adjustment, the control system 16 controls the active suspension vehicle to step onto the boss 4 at the next moment, and at the same time controls the active actuator 13 to implement active telescopic adjustment, thus synchronously completed the active adjustment of the modified array of active suspension adjustment at the next moment. As shown in FIG. 3*c*, the vehicle height remains stable, the attitude remains level, and the right front wheel is unloaded when stepping onto the boss 4, while the loads of the other five wheels remain balanced.

Finally, it should be noted that the above is only a preferred embodiment of the present disclosure and the technical principles applied. It will be understood by those persons skilled in the art that the disclosure is not limited to the particular embodiments described herein and that various variations, readjustments, and substitutions are apparent to those skilled in the art without departing from the scope of protection of the disclosure. Thus, although the disclosure has been described in some detail by the above embodiments, the disclosure is not limited to the above embodiments but may include many more equivalent embodiments without departing from the idea of the disclosure, the scope of which is determined by the scope of the appended claims.

We claim:

1. A control method for controlling an active suspension vehicle, the active suspension vehicle comprising:

a vehicle body;

a wheel carriage assembly, comprising two or more axles and a plurality of wheels associated therewith, with the wheel carriage assembly being connected to the vehicle body and operable to lift and rotate each of the two or more axles relative to the vehicle body;

an active suspension system, comprising a plurality of active actuators and shock absorbers, each of the shock absorbers is connected at one end to the vehicle body and at the other end to one of the active actuators, which in turn is connected at its opposite end to the wheel carriage assembly, and each of the active actuators being operable to extend and shorten along its axis;

a sensing system, comprising a front-road preview system, a body state measurement system, a vehicle speed measurement system, and a driving measurement system; and a control system, with the sensing system and the active suspension system being connected to the control system as input end and output end, respectively;

wherein the control method comprises the following steps:

step 1, setting a Cartesian coordinate system defined with a center of mass of the vehicle body as an origin, an x-axis parallel to an axis of the vehicle body and pointing in a driving direction of the active suspension vehicle, a z-axis pointing vertically upward, and a y-axis perpendicular to a longitudinal plane of symmetry of the active suspension vehicle and pointing to a left side of the driving direction; each of the plurality of active actuators being denoted with a corresponding subscript number with each of the plurality of the wheels;

step 2, building a load and deformation joint control matrix of the active suspension vehicle and storing the load and deformation joint control matrix in the control system by the following steps: placing the active suspension vehicle on a horizontal road; driving a j-th active actuator of the plurality of active actuators comprised in the active suspension system, j=1, 2, . . . n, to actively extend with other active actuators of the plurality of active actuators remaining inactive; measuring a displacement of each of the plurality of the active actuators in real-time via a corresponding displacement sensor of the body state measurement system until a unit displacement being generated; measuring a load increment of each of the plurality of the wheels via a corresponding force sensor of the body state measurement system; storing the load increment of each of the plurality of the wheels in order from 1 to n in rows 1 to n of the j-th column of a matrix as $\Delta f_{1j}, \Delta f_{2j}, \ldots \Delta f_{nj}$; and at the same time, measuring increments of a roll angle and a pitch angle of the vehicle body via an attitude sensor of the body state measurement system, and storing angle increments in rows n+1 to n+2 of the j-th column of the matrix as $\Delta\theta_{xj}, \Delta\theta_{yj}$; and performing said measuring and said storing until the load and deformation joint control matrix being constructed and stored in the control system as follows:

$$\begin{bmatrix} K \\ T \end{bmatrix}_{(n+2)\times n} = \begin{bmatrix} \Delta f_{11} & \ldots & \Delta f_{1j} & \Delta f_{1n} \\ \Delta f_{21} & \ddots & \Delta f_{2j} & \Delta f_{2n} \\ \vdots & \vdots & \vdots & \vdots \\ \Delta f_{n1} & \ldots & \Delta f_{nj} & \Delta f_{nn} \\ \Delta\theta_{x1} & \ldots & \Delta\theta_{xj} & \Delta\theta_{xn} \\ \Delta\theta_{y1} & \ldots & \Delta\theta_{yj} & \Delta\theta_{yn} \end{bmatrix}_{(n+2)\times n}; \quad (1)$$

step 3, measuring the roll angle and the pitch angle of the vehicle body at a present moment in an actual road traveling via the attitude sensor of the body state measurement system; measuring a load of each of the plurality of wheels at the present moment via the corresponding force sensor of the body state measurement system; and constructing an array of wheel loads at the present moment $[F_1{}^c \ldots F_i{}^c \ldots F_n{}^c]^T$;

step 4, the control system determines a vertical height excitation array $[d_1 \ldots d_i \ldots d_n]^T$ by calling a front-road preview system and a path planning procedure that each of the plurality of the wheels will be subjected to at a next moment of the present moment; and calculating an average value of the vertical height excitation array $\bar{d}$;

step 5, determining by the control system, a vehicle height expectation and vehicle pitch and roll attitude expectations for the active suspension vehicle driving on a road with road features corresponding to the vertical height excitation array at the next moment; at the same time, setting wheel load distribution expectations i=1, 2, . . . n, for the next moment; and determining feasible wheel load expectations by the following steps: firstly, solving initial wheel load expectations i=1, 2, . . . n, by taking minimum mean square deviation between wheel loads and the wheel load distribution expectations as an optimization objective, and mechanical equilibrium conditions as constraints; then, taking the initial wheel load expectations $\{F_i^{*1}\}$ as initial value of optimization, setting an effective optimization range for the load of each of the plurality of the wheels, and taking mechanical equilibrium conditions as constraints, and continuing optimization to calculate the feasible wheel load expectations $F_i{}^*$, i=1, 2, . . . n, for the active suspension vehicle driving on the road with road features corresponding to the vertical height excitation array at the next moment;

step 6, constructing a pre-calculation equation for passive responses of vehicle attitude and wheel loads based on the load and deformation joint control matrix, the roll angle, the pitch angle, and the array of wheel loads at the present moment, and the vertical height excitation array, as follows:

$$\begin{bmatrix} F_i^y \\ \theta_j^y \end{bmatrix}_{(n+2)\times 1} = \begin{bmatrix} K \\ T \end{bmatrix}_{(n+2)\times n} \{d_i\}_{n\times 1} + \begin{bmatrix} F_i^c \\ \theta_j^c \end{bmatrix}_{(n+2)\times 1},\qquad(2)$$

wherein, $F_i^y$, i=1, 2, . . . n being a pre-calculated load increments that each of the plurality of the wheels will be subjected to when the active suspension vehicle driving on the road with road features corresponding to the vertical height excitation array at the next moment; $\theta_j^y$, j=x, y being the pre-calculated roll angle and pitch angle increments that the vehicle body will generate when the active suspension vehicle driving on the road with road features corresponding to the vertical height excitation array at the next moment; and the average value $\overline{d}$ being the height increment that the vehicle body will generate at the next moment; and solving equation (2) to obtain passive responses of vehicle attitude and wheel loads;

step 7, constructing an inverse-calculation equation for active suspension adjustment based on the load and deformation joint control matrix, the passive responses of vehicle attitude and wheel load, and the vehicle attitude expectations and the feasible wheel load expectations $$\begin{bmatrix} K \\ T \end{bmatrix}_{(n+2)\times n} \{a_i\}_{n\times 1} = \left\{ \begin{matrix} F_i^* - F_i^y \\ \theta_j^* - \theta_j^y \end{matrix} \right\}_{(n+2)\times 1},\qquad(3)$$

wherein, $\theta_j{}^*$, j=x, y, being the vehicle attitude expectations;

step 8, solving equation (3) to obtain a basic array of active suspension adjustment $[a_1 \ldots a_i \ldots a_n]^T$, and calculating an average value $\overline{a}$; subtracting the average value $\overline{a}$ from the basic array of active suspension adjustment, and compensating the vehicle height expectation $a_h$ to obtain a following equation $$\{a_i^*\}_{n\times 1} = \{a_i\}_{n\times 1} - \overline{a} + a_h;\qquad(4)$$

step 9, solving equation (4) to obtain a modified array of active suspension adjustment $[a_1{}^*, \ldots a_i{}^* \ldots a_n]^T$ that synchronously achieving the vehicle height expectation, the vehicle attitude expectations, and the feasible wheel load expectations when the active suspension vehicle driving on the road with road features corresponding to the vertical height excitation array at the next moment;

step 10, controlling the active suspension vehicle to drive on the road with road features corresponding to the vertical height excitation array at the next moment, and in the meanwhile controlling each of the plurality of the active actuators to implement the active suspension adjustment, thus synchronously completing an active adjustment of the modified array of active suspension adjustment at the next moment; hence achieving a synchronous and active control of vehicle height, attitude, and wheel load distribution in a time interval between the present moment and the next moment; and step 11, judging whether the active suspension vehicle having passed an extreme off-road terrain by a subjective decision of a driver or an objective decision of a controller based on road characteristics: if yes, terminating the active control; and if no, go back to step 3, resolving an active suspension adjustment stroke and performing cyclic control until the active suspension vehicle passing the extreme off-road terrain.

2. The control method controlling the active suspension vehicle of claim 1, wherein determining the vertical height excitation array comprises the following steps:

step 2.1, retrieving vehicle attitude parameters from the body state measurement system, point cloud data of the actual road from the front-road preview system, and performing grid filtering of the point cloud data to obtain a filtered point cloud data of the actual road in front of the active suspension vehicle;

step 2.2, retrieving driving and steering parameters from the vehicle speed measurement system and the driving measurement system, and the vehicle attitude parameters from the body state measurement system, and conducting the path planning procedure to obtain a driving path and corresponding arrival time for each of the plurality of the wheels; and step 2.3, retrieving a vertical height excitation data that each of the plurality of the wheels will be subjected to at the next moment of the present moment based on the filtered point cloud data and the driving path and corresponding arrival time; and constituting the vertical height excitation array for the step 4 of claim 1 to use.

3. The active suspension vehicle of claim 1, wherein the active suspension vehicle is configured to implement the control method of claim 1, and wherein:

the front-road preview system comprises at least a Lidar which transmits the point cloud data of the actual road in front of the active suspension vehicle within a longitudinal distance from the wheels of a first axle to at least one times of vehicle length to the control system;

the body state measurement system comprises the attitude sensor transmits the roll angle, the pitch angle, a yaw angle of the vehicle body and their corresponding angular velocities and angular accelerations to the control system, force sensors transmit a supporting load of each of the plurality of the active actuators to the control system, according to which the load of a corresponding wheel is calculated as a function of the supporting load, the corresponding displacement sensor transmit a telescopic displacement of each of the plurality of the active actuators to the control system, according to which the vehicle height is calculated as a function of the telescopic displacement;

the vehicle speed measurement system comprises wheel speed sensors installed on the wheels on at least both sides of a front axle and a rear axle of the two or more axles, and is matched with corresponding force sensors on each of the plurality of the active actuators; the vehicle speed measurement system transmits the calculated driving speed of the active suspension vehicle to the control system based on wheel speed of loaded wheels;

the driving measurement system transmits driver's inputs at least from a steering wheel, a throttle, and a brake to the control system, and the control system comprises a storage unit storing the load and deformation joint control matrix of the active suspension vehicle, and the expectations of vehicle height, vehicle attitude, and wheel load distribution for extreme off-road terrain.

\* \* \* \* \*